US007756884B2

(12) United States Patent
Okabe et al.

(10) Patent No.: US 7,756,884 B2
(45) Date of Patent: Jul. 13, 2010

(54) INFORMATION PROCESSING APPARATUS, INFORMATION PROCESSING METHOD, AND PROGRAM

(75) Inventors: Kouya Okabe, Yokohama (JP); Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 11/401,912

(22) Filed: Apr. 12, 2006

(65) Prior Publication Data

US 2006/0242131 A1 Oct. 26, 2006

(30) Foreign Application Priority Data

Apr. 20, 2005 (JP) ............................. 2005-122948

(51) Int. Cl.
  *G06F 7/00* (2006.01)
  *G06F 17/30* (2006.01)
(52) U.S. Cl. ..................................................... 707/758
(58) Field of Classification Search ....................... None
  See application file for complete search history.

(56) References Cited

U.S. PATENT DOCUMENTS

| 5,351,247 | A  | * | 9/1994  | Dow et al. ..................... 714/26  |
| 6,091,518 | A  | * | 7/2000  | Anabuki ...................... 358/500  |
| 6,771,808 | B1 | * | 8/2004  | Wallack ....................... 382/151 |
| 6,904,427 | B1 | * | 6/2005  | Hagiwara et al. ............... 707/3  |
| 7,206,462 | B1 | * | 4/2007  | Betke et al. .................. 382/280 |
| 7,266,546 | B2 | * | 9/2007  | Son ............................... 707/3 |
| 7,366,718 | B1 | * | 4/2008  | Pugh et al. ...................... 707/6 |
| 7,386,540 | B2 | * | 6/2008  | Anderson et al. ............... 707/3 |
| 2002/0165855 | A1 | * | 11/2002 | Ohtomo ......................... 707/3  |
| 2003/0123079 | A1 |   | 7/2003  | Yamaguchi et al. ......... 358/1.15 |
| 2003/0177111 | A1 | * | 9/2003  | Egendorf et al. ............... 707/3  |
| 2005/0262052 | A1 | * | 11/2005 | Daniels et al. .................. 707/3 |
| 2006/0119890 | A1 |   | 6/2006  | Nakajima ................... 358/1.15 |
| 2006/0173904 | A1 |   | 8/2006  | Nakajima .................... 707/102 |

FOREIGN PATENT DOCUMENTS

JP        11-134125        5/1999

* cited by examiner

*Primary Examiner*—Uyen T. Le
(74) *Attorney, Agent, or Firm*—Fitzpatrick, Cella, Harper & Scinto

(57) ABSTRACT

To provide an information processing apparatus, information processing method, and program which can easily and appropriately inform the user of differences in results of searches performed based on the same search criteria at different times. An information processing apparatus retrieves first search results by searching a network for information using predetermined search criteria. The search criteria used in the search is registered. After the retrieval of the first search results, the information processing apparatus retrieves second search results by searching the network for information again using the registered search criteria. The information processing apparatus detects difference information from the retrieved information by comparing the first and second search results.

10 Claims, 13 Drawing Sheets

F I G. 4
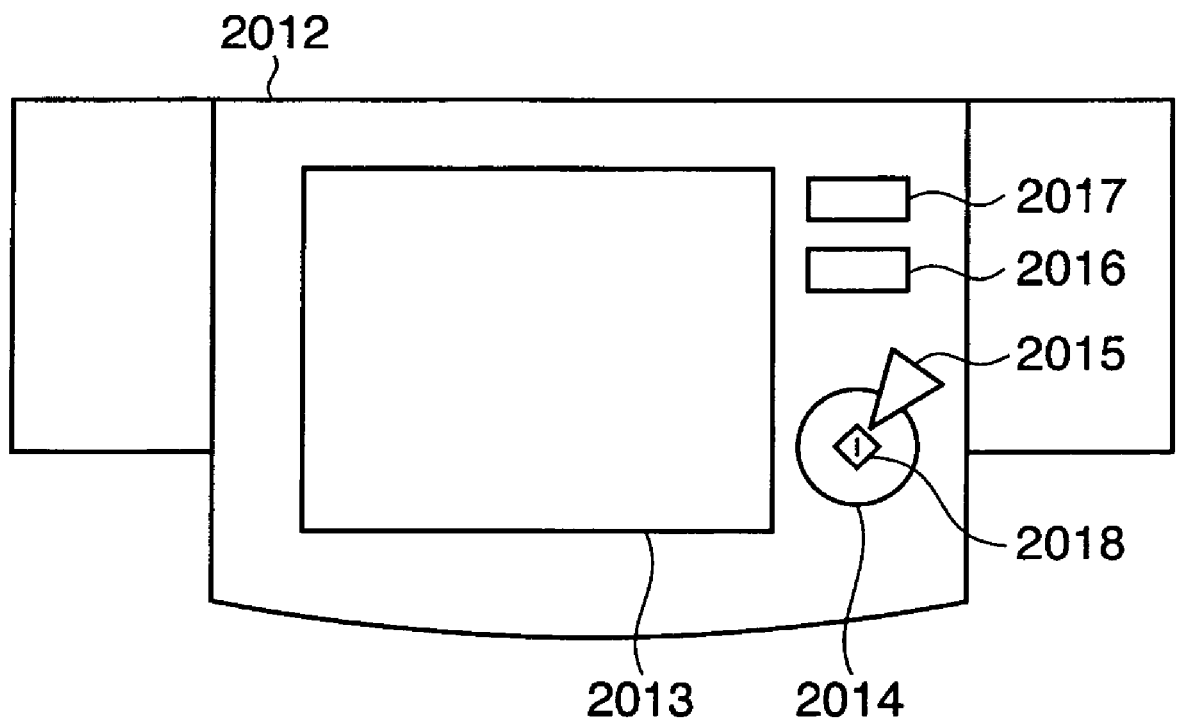

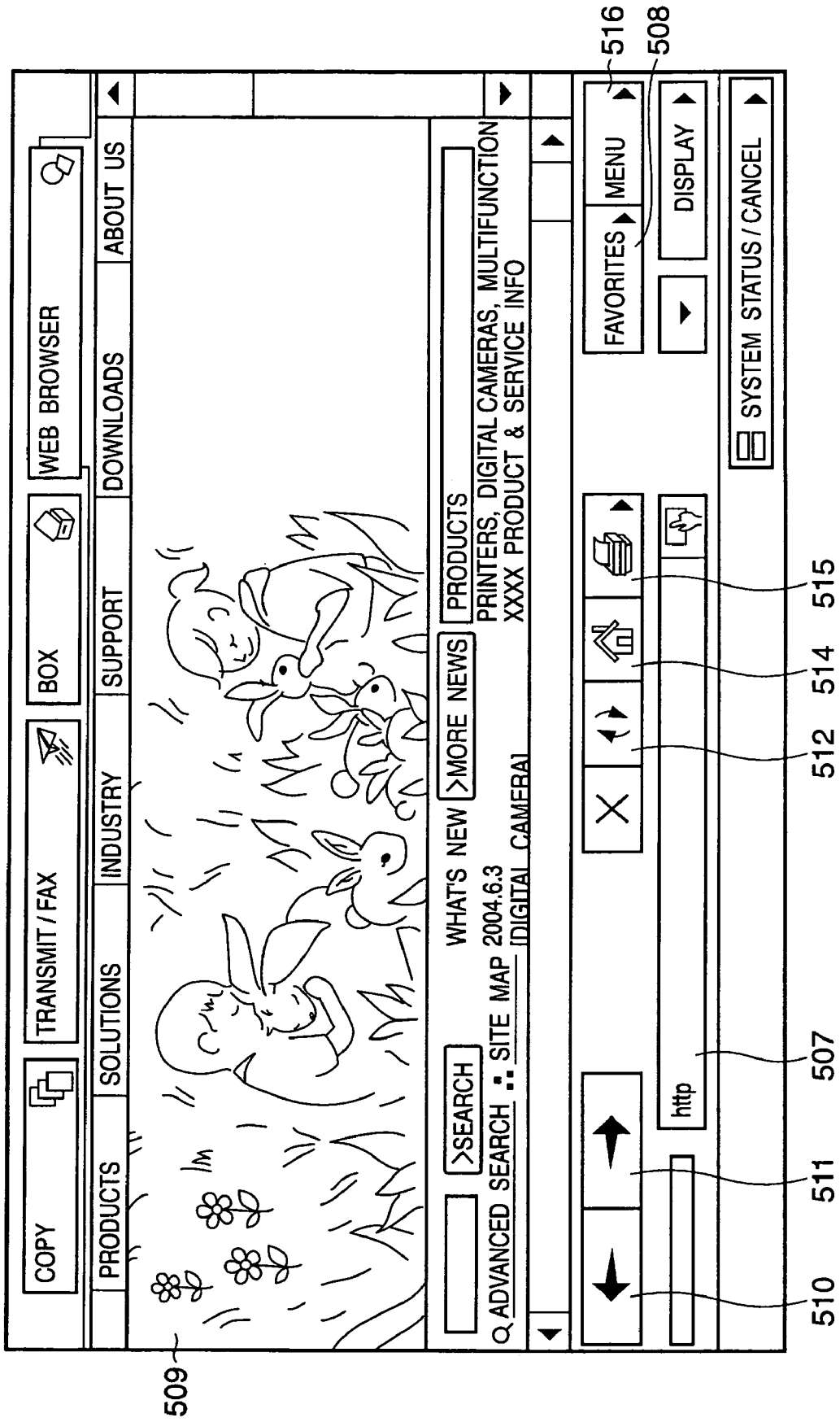

INFORMATION PROCESSING APPARATUS, INFORMATION PROCESSING METHOD, AND PROGRAM

FIELD OF THE INVENTION

The present invention relates to an information processing apparatus, information processing method, and program implementable on multifunction devices which can communicate via a network.

BACKGROUND OF THE INVENTION

Recently, multifunction devices produced by adding a number of functions to a digital copier serving as a base have been put to practical use. The multifunction devices have capabilities to conduct facsimile communications using scanner and printer functions inherent in the digital copier, convert code data sent from a computer into bitmap data and print out the resulting bitmap data on the printer, transmit images read by the scanner to other devices on a network, and print images delivered via the network on the printer.

Also, control panels of the multifunction devices have become larger in size and higher in resolution, making it possible not only to configure settings for the scanner and printer functions, but also to operate remote apparatus on a network and monitor equipment condition using their operation screens or display or print web content using a built-in browser. Incidentally, patent documents related to the present invention include Japanese Patent Laid-Open No. 11-134125.

However, with built-in web-browser functions of a multifunction device such as those described above or a personal computer, results of web site searches by means of a search engine may vary with the database contents of the search engine even if the same keywords are used.

On the WWW, there are always web sites which appear newly, web sites which disappear, and web sites which change their contents. Data in databases of search engines are generally collected by crawling around the WWW automatically. The data are constituted of snapshots taken during the automatic crawling and the database contents can often vary depending on time. Thus, when a user performs a search using search criteria on a search engine, web sites which match the search criteria can vary with the time of the search.

Thus, by analyzing variations in search results with time, it is possible to tell sites which have appeared newly. However, search results are generally listed in an order irrespective of the time of appearance of web sites and if a user tries to analyze variations in search results (difference information) manually, checkups involve a great burden. Also, the user must check URLs one after another visually by comparing them between search results produced at two different times. Although recent multifunction devices and other information processing apparatus are equipped with relatively high-performance screens, they are insufficient in terms of screen size, viewability, or operability, increasing the burden on the user with increases in the volume of search results.

SUMMARY OF THE INVENTION

The present invention has been made in view of the above circumstances and has an object to provide an information processing apparatus, information processing method, and program which can easily and appropriately inform the user of differences in results of searches performed based on the same search criteria at different times.

To solve the above problems, the present invention provides an information processing apparatus capable of communicating via a network, comprising:

a search unit adapted to perform an information search process on the network using input search criteria;

a registration unit adapted to register the search criteria used by the search unit in the search process;

a first search result retrieval unit adapted to retrieve first search results produced by the search unit using the search criteria;

a re-search unit adapted to search the network for information again after the retrieval of the first search results using the search criteria registered by the registration unit;

a second search result retrieval unit adapted to retrieve second search results produced by the re-search unit using the search criteria; and a difference detection unit adapted to detect difference information from retrieved information by comparing the first search results and the second search results.

Also, to solve the above problems, the present invention provides an information processing method for an information processing apparatus capable of communicating via a network, comprising:

a search step of performing an information search process on the network using input search criteria;

a registration step of registering the search criteria used by the search step in the search process;

a first search result retrieval step of retrieving first search results produced by the search step using the search criteria;

a re-search step of searching the network for information again after the retrieval of the first search results using the search criteria registered by the registration step;

a second search result retrieval step of retrieving second search results produced by the re-search step using the search criteria; and a difference detection step of detecting difference information from retrieved information by comparing the first search results and the second search results.

Also, to solve the above problems, the present invention provides a program for an information processing apparatus capable of communicating via a network, wherein the program makes the computer execute:

a search step of performing an information search process on the network using input search criteria;

a registration step of registering the search criteria used by the search step in the search process;

a first search result retrieval step of retrieving first search results produced by the search step using the search criteria;

a re-search step of searching the network for information again after the retrieval of the first search results using the search criteria registered by the registration step;

a second search result retrieval step of retrieving second search results produced by the re-search step using the search criteria; and a difference detection step of detecting difference information from retrieved information by comparing the first search results and the second search results.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 4 is an external view of an operation panel 2012 of the copier 1001 according to the embodiment of the present invention;

FIG. 5B is a diagram showing an example of a browser startup screen brought up when a Web Browser key 504 is pressed on the operation screen shown in FIG. 5A;

DETAILED DESCRIPTION OF THE PREFERRED EMBODIMENTS

An information processing apparatus and information processing method according to an embodiment of the present invention will be described in detail below with reference to the drawings.

<Network Configuration>

Figure 1:
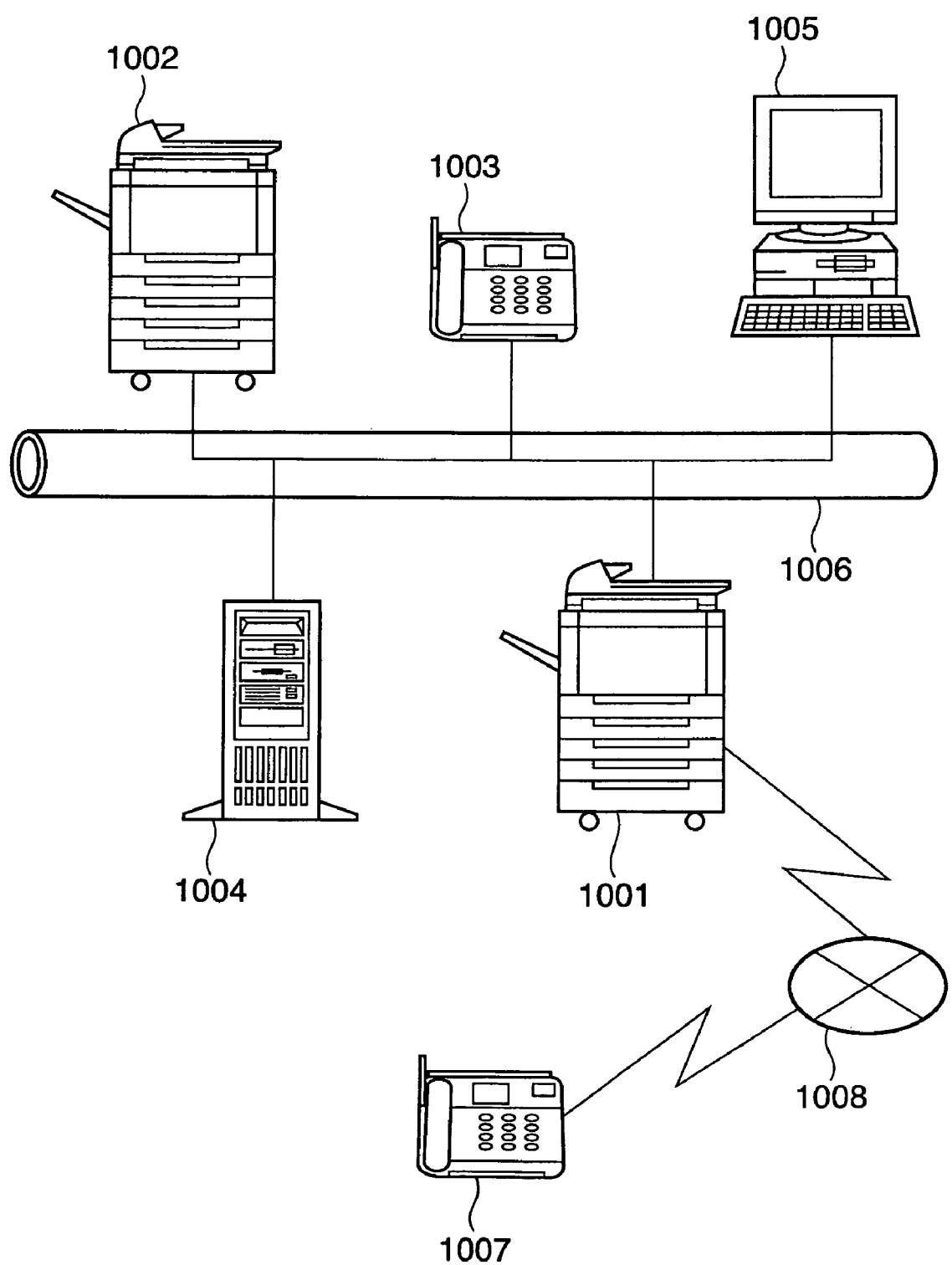
FIG. 1 is a configuration diagram schematically showing a configuration of a network system equipped with multifunction devices incorporating an information processing apparatus according to an embodiment of the present invention.

FIG. 1 is a configuration diagram schematically showing a configuration of a network system equipped with multifunction devices incorporating an information processing apparatus according to an embodiment of the present invention. In this embodiment, a copier incorporating web-browser functions will be cited as a multifunction device.

In the network system shown in FIG. 1, a copier 1001 is connected to a copier 1002 equipped with functions equivalent to those of the copier 1001, a facsimile machine 1003, a database/mail server 1004, and a client computer 1005 as well as to a LAN 1006 consisting of a network such as Ethernet (registered trademark). Also, being included in a public circuit (WAN) 1008, the copier 1001 is ready to communicate with a facsimile machine 1007.

The copier 1001 according to this embodiment has a data transmission function for reading original images and transmitting resulting image data to various devices included in the LAN 1006 as well as a copy function and facsimile function. Also, the copier 1001 has a PDL function, and at the instruction of the client computer 1005 connected to the LAN 1006, it can receive and print PDL images transmitted from the computer. Incidentally, the copier 1001 is capable of storing images read by the copier 1001 itself and PDL images transmitted from a computer and the like connected to the LAN 1006 in a specified box region on a hard disk in the copier 1001 and printing out the images stored in the box region.

Also, the copier 1001 is capable of receiving image data read by the copier 1002, via the LAN 1006, storing them on a hard disk in the copier 1001, and printing them out. Furthermore, the copier 1001 is capable of receiving images accumulated in the database server 1004 via the LAN 1006, storing them on a hard disk in the copier 1001, and printing them out, at the instruction of the client computer 1005.

The facsimile machine 1003 is capable of receiving data read by the copier 1001, via the LAN 1006, and transmitting the received data to other devices. Also the facsimile machine 1007 is capable of receiving data read by the copier 1001, via the public circuit 1008, and printing out the received data.

On the other hand, the database/mail server 1004 is a server machine which has capabilities to receive data read by the copier 1001, via the LAN 1006, store the data in a database, and transmit the data as e-mail. The client computer 1005 is connected to the database/mail server 1004 via the LAN 1006 and is capable of receiving desired data from the database/mail server 1004 and displaying them. Also, the client computer 1005 is capable of receiving data read by the copier 1001 via the LAN 1006 as well as processing and editing the received data.

<Main Components of Copier>

Figure 2:
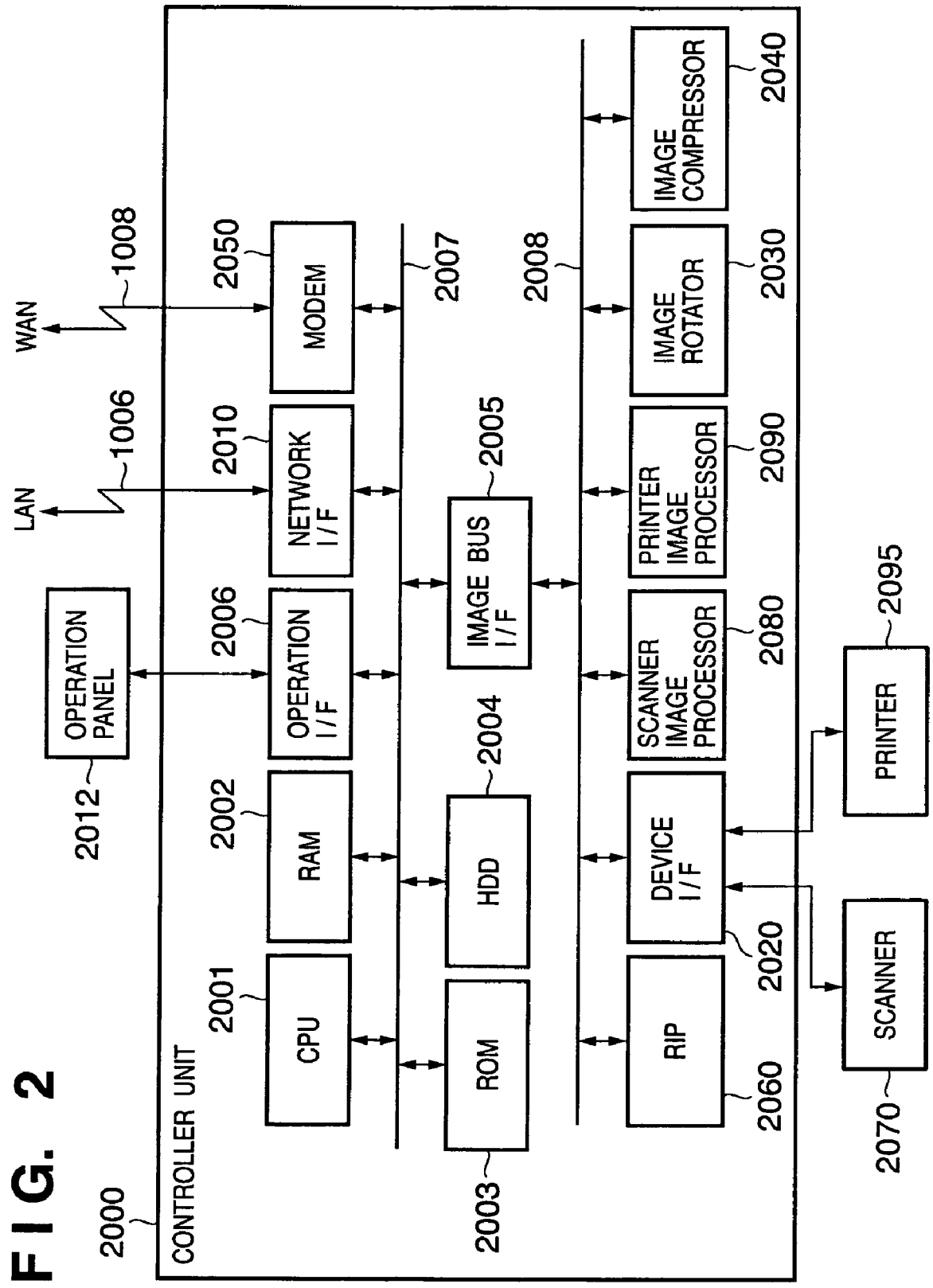
FIG. 2 is a block diagram showing main components of a copier 1001 according to the embodiment of the present invention.

FIG. 2 is a block diagram showing main components of the copier 1001 according to the embodiment of the present invention. As shown in FIG. 2, the copier 1001 has a controller unit 2000 which functions as an information processing apparatus. Being connected with a scanner 2070 which is an image input device and printer 2095 which is an image output device, the controller unit 2000 performs control in order to implement a copy function for printing out, on the printer 2095, image data read from an original image by the scanner 2070. Also, the controller unit 2000 performs control in order to input and output pattern images, device information, and the like from/to other devices via the LAN 1006 or public circuit (WAN) 1008.

As shown in FIG. 1, the controller unit 2000 has a CPU 2001. The CPU 2001 starts up an operating system (OS) using a boot program stored in a ROM 2003 and runs, on the OS, application programs stored in an HDD (hard disk drive) 2004, thereby performing various processes. A RAM 2002 is used by the CPU 2001 as a work area. In addition to the work area of the CPU 2001, the RAM 2002 provides an image storage area for use to store image data temporarily. The HDD 2004 stores the image data together with the application programs.

The CPU 2001 is connected with an operation I/F (operation interface) 2006, network I/F (network interface) 2010, modem 2050, and image bus I/F (image bus interface) 2005 via a system bus 2007 as well as with the ROM 2003 and RAM 2002.

The operation I/F 2006 provides an interface with an operation panel 2012 which has a touch panel. It outputs image data to the operation panel 2012 in order for the image data to be displayed on the operation panel 2012. Also, the operation I/F 2006 sends out information inputted by the user on the operation panel 2012 to the CPU 2001.

The network I/F 2010 is connected to the LAN 1006 and is used to input/output information via the LAN 1006 from/to various devices connected to the LAN 1006. The modem 2050 is connected to the public circuit 1008 and is used to input/output information from/to other devices via the public circuit 1008.

The image bus I/F 2005 is a bus bridge used to convert data structure by connecting the system bus 2007 with an image bus 2008 which transfers image data at high speed. The image bus 2008 consists of a PCI bus or IEEE 1394. The image bus 2008 is connected with a raster image processor (RIP) 2060, device I/F 2020, scanner image processor 2080, printer image processor 2090, image rotator 2030, thumbnail creator 2035, and image compressor 2040.

The RIP 2060 converts PDL code into bitmap images. The device I/F 2020 is connected with the scanner 2070 and printer 2095 and converts image data synchronously or asynchronously. The scanner image processor 2080 corrects, processes, or edits input image data. The printer image processor 2090 corrects printout image data for the printer, converts their resolution, and so on. The image rotator 2030 rotates image data. The image compressor 2040 compresses/decompresses multi-valued image data into/from JPEG data and compresses/decompresses binary image data into/from JBIG, MMR, MH, or other data.

<Hardware Configuration of Copier 1001>

Figure 3:
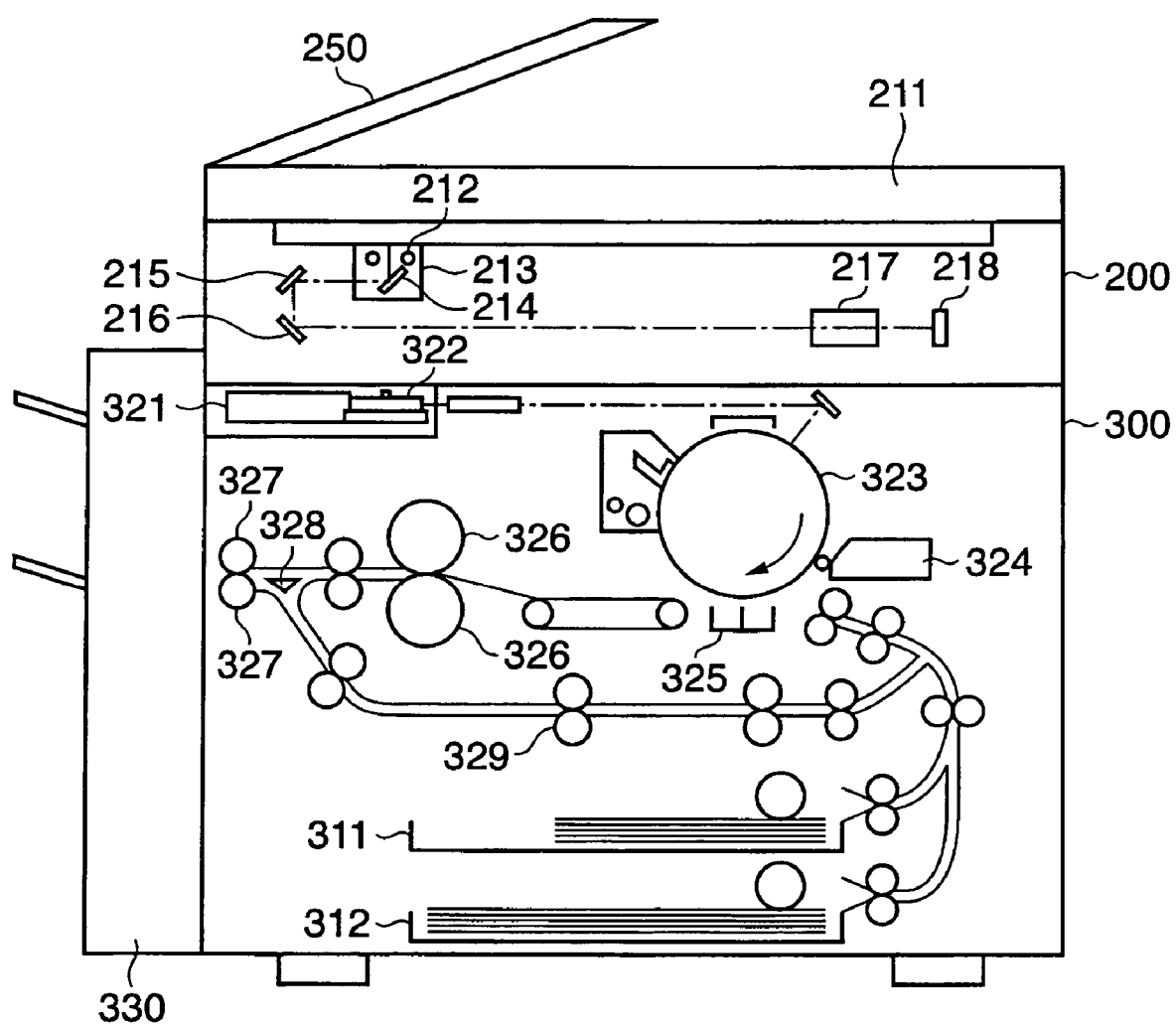
FIG. 3 is a hardware configuration diagram showing a reader 2070 and printer 2095 of the copier 1001 according to the embodiment of the present invention.

FIG. 3 is a hardware configuration diagram showing the reader 2070 and printer 2095 of the copier 1001 according to the embodiment of the present invention. As shown in FIG. 3, the reader 2070 and printer 2095 of the copier 1001 of the printer 2095 are constructed integrally.

The reader 2070 has a document feeder unit 250, which feeds an original sheet by sheet beginning with the uppermost sheet onto a platen glass 211 and ejects each sheet of the original onto an output tray (not shown) from the platen glass 211 each time scanning of the sheet is finished. When a sheet of the original is fed onto the platen glass 211, the reader 2070 turns on a lamp 212 and starts moving a transport unit 213. As the transport unit 213 moves, the reader 2070 scans the original on the platen glass 211.

During the scanning, the reader 2070 leads reflected light from the original to a CCD image sensor (hereinafter referred to as the "CCD") 218 through mirrors 214, 215, and 216 and a lens 217 and focuses an image in the original on an imaging surface of the CCD 218. The image formed on the imaging surface is converted into an electrical signal which is inputted in a controller (not shown) after going through predetermined processing. Incidentally, the controller here corresponds to the controller unit 1008 in FIG. 2.

The printer 2095 has a laser driver 321, which drives a laser emitter 322 based on image data from the controller. Consequently, the laser emitter 322 emits a laser beam according to the image data. The laser beam is directed at a photoconductive drum 323 while being scanned. An electrostatic latent image is formed by the laser beam on the photoconductive drum 323 and visualized as a toner image by means of toner supplied from a developing device 324. In synchronization with the emission of the laser beam, recording paper is supplied to between the photoconductive drum 323 and transfer unit 325 from cassettes 311 and 312 via a transport path, and the toner image on the photoconductive drum 323 is transferred to the supplied recording paper by the transfer unit 325.

The recording paper onto which the toner image is transferred is transported to a fixing roller pair (a heating roller and pressing roller) 326 by a transport belt. The fixing roller pair 326 hot-press the recording paper and thereby fix the toner image on the recording paper. After passing through the fixing roller pair 326, the recording paper is ejected to a paper output unit 330 by a paper output roller pair 327. The paper output unit 330 consists of a sheet processor capable of postprocessing such as sorting and stapling. If duplex recording mode is set, after the recording paper is transported to the paper output roller pair 327, the paper output roller pair 327 is reversed and the recording paper is led by a flapper 328 to a paper refeed path 339. From the paper refeed path 339, the recording paper is supplied again to between the photoconductive drum 323 and transfer unit 325 in synchronization with the emission of a laser beam, and a toner image is transferred to the reverse side of the recording paper.

<Configuration of Operation Panel 2012>

FIG. 4 is an external view of the operation panel 2012 of the copier 1001 according to the embodiment of the present invention. As shown in FIG. 4, the LCD display 2013 of the operation panel 2012, which has a touch panel sheet attached to its LCD surface, displays a system operation screen and transmits position information of any displayed key to the CPU 2001 of the controller unit 2000 when the key is pressed.

In FIG. 4, a Start key 2014 is pressed to start reading an original image and so on. A two-color LED 2018, green and red, is mounted in the center of the Start key 2014. It indicates, by its color, whether the Start key 2014 is enabled. A Stop key 2015 is pressed to stop the current operation. An ID key 2016 is used to enter the user ID of the user. A Reset key 2017 is pressed to restore initial settings of the operation panel 2012.

<Operation Screen of Operation Panel 2012>

Figure 5A:
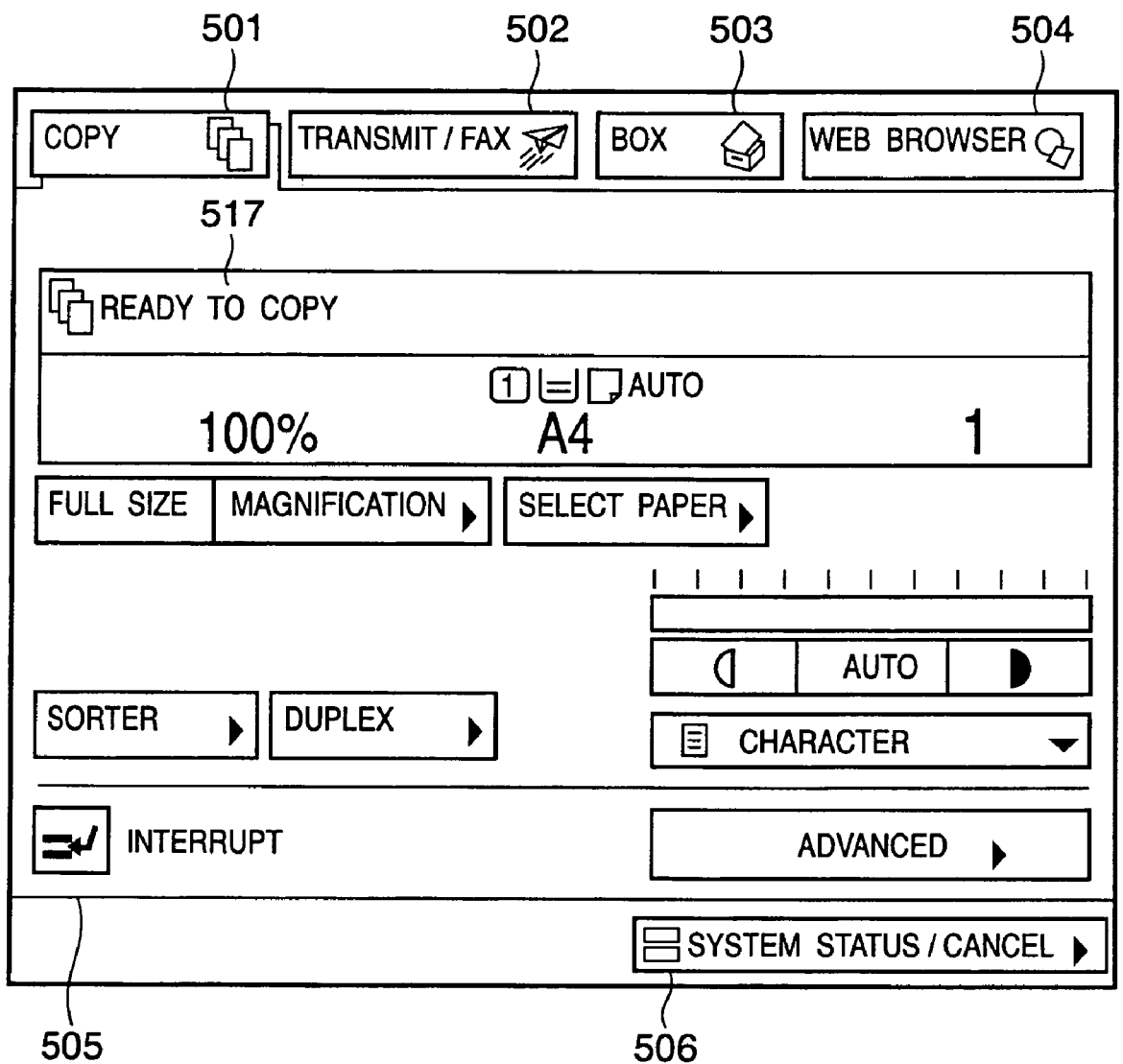
FIG. 5A is a diagram showing an example of an operation screen displayed on an LCD display 2013 of the operation panel 2012 of the copier 1001 according to the embodiment of the present invention.

FIG. 5A is a diagram showing an example of the operation screen displayed on the LCD display 2013 of the operation panel 2012 of the copier 1001 according to the embodiment of the present invention. As shown in FIG. 5A, touch keys, namely, a Copy key 501, Transmit/Fax key 502, Box key 503, and Web Browser key 504, each of which represents multiple functions are displayed as tabs across the top of the operation screen. According to this embodiment, the ROM 2003 of the controller unit 2000 contains a program for web browser display, making it possible to display the web browser on instructions from the operation panel 2012.

The operation screen shown in FIG. 5A is an initial screen brought up when a touch key corresponding to the Copy key 501 is pressed. In FIG. 5A, an area 517 which contains a message "Ready to Copy" displays status of the copy function. Below this is an area which displays magnification, selected paper feed stage, and numeric entry. Also, the operation screen displays touch keys for use to make operation mode settings of the copy function including a Full Size key, Magnification key, Select Paper key, Sorter key, Duplex key, Interrupt key, and Character key as well as density adjustment keys which in turn includes a left arrow key used to decrease the density, right arrow key used to increase the density, and Auto key for automatic density adjustment. Regarding operation modes which do not fit in the initial screen, the operation screen provides an Advanced key which, when pressed, brings up settings screens hierarchically.

Besides, status of the copier 1001 is displayed in a display area 505 at the bottom of the operation screen. The display area 505 displays, for example, an alarm message about a jam or the like, or a status message about any PDL printing in progress.

Furthermore, a System Status/Cancel key 506 at the bottom of the operation screen, when pressed, brings up a screen which displays device information about the copier 1001 or a screen which displays print job status, allowing the user to cancel a job.

The Transmit/Fax key 502 on the operation screen in FIG. 5A is pressed to transmit images read by the copier 1001 to devices on the LAN 1006 by using e-mail, FTP, or the like or display a settings screen for facsimile transmission via the public circuit 1008.

The Box key 503 on the operation screen in FIG. 5A is pressed to store (register) images read by the copier 1001 in a box region on the HDD 2004, print a specified image stored in the box region, or transmit the image to devices on the LAN 1006.

The Web Browser key 504 on the operation screen in FIG. 5A is pressed to open a browser startup screen shown in FIG. 5B on the operation screen of the operation panel 2012. FIG. 5B is a diagram showing an example of the browser startup screen brought up when the Web Browser key 504 is pressed on the operation screen shown in FIG. 5A.

On the screen shown in FIG. 5B, a URL input field 507 is pressed to open a page by specifying a URL. An administrator may configure the field such that a soft keyboard will be displayed at the press of the field, allowing the user to specify a URL. A Favorites key 508 allows the user to add, organize, select, or display URLs. A display area 509 is used to display content.

In FIG. 5B, a Back key 510 is pressed to return to the previous page and a Next key 511 is pressed to display the next page. A Refresh key 512 is pressed to reload and display the current page. A Stop key 513 is pressed to stop loading the page. A Home key 514 is pressed to go to a home page set by the user.

In FIG. 5B, a Print key 515 is pressed to print the current page. Pressing the Print key 515 brings up a Printer Settings dialog box, allowing the user to specify how to print frames and other print settings (e.g., number of copies, duplex, sort order, and the like). Pressing a Start Printing button in the dialog box starts printing. A Menu key 516 is pressed to display a screen for use to change screen display magnification, character size, character code, and the like.

<Configuration of Information Processing Apparatus>

Figure 6:
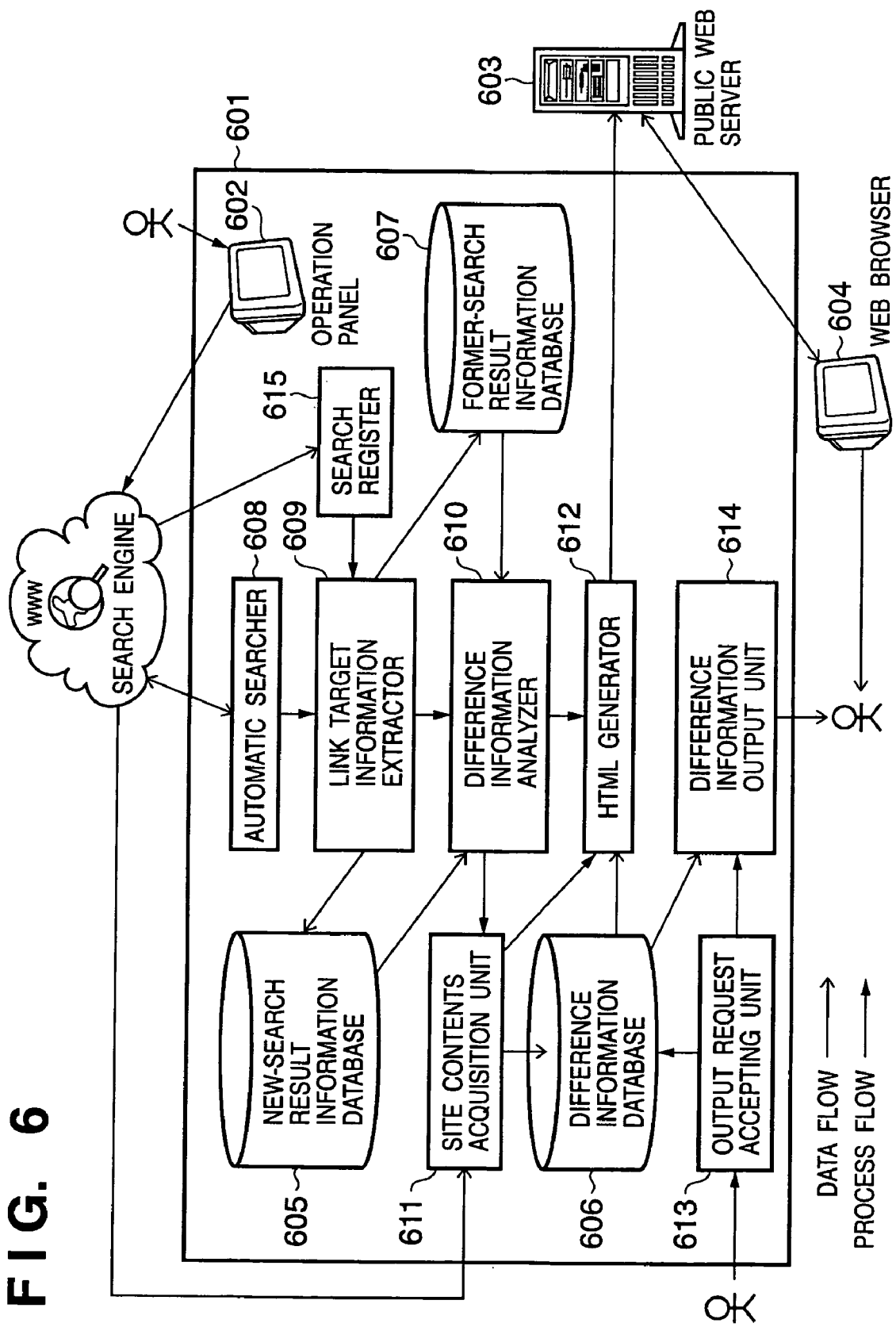
FIG. 6 is a block diagram showing a configuration of the information processing apparatus implemented in the copier 1001 according to the embodiment of the present invention.

FIG. 6 is a block diagram showing a configuration of the information processing apparatus implemented in the copier 1001 according to the embodiment of the present invention. In FIG. 6, the information processing apparatus 601 is implemented in the copier 1001 shown in FIG. 1. The user accesses the WWW and searches for web sites via an operation panel 602. A search register 615 stores the search terms used in the search in a former-search result information database 607 if the user intends to perform a search later using the same search criteria again and acquire difference information by comparing the old and new search results. Also, the search register 615 acquires search results for the search terms and passes them to a link target information extractor 609. The link target information extractor 609 extracts link target URLs from an HTML file outputted by a search engine and stores them in the former-search result information database 607.

An automatic searcher 608 shown in FIG. 6 cruise periodically or by being triggered by a user request. The automatic searcher 608 automatically performs searches using the search terms registered by the search register 615, retrieves search results, and passes them to the link target information extractor 609. The link target information extractor 609 extracts link target URLs from an HTML file outputted by a search engine and stores them in a new-search result information database 605.

In FIG. 6, a difference information analyzer 610 acquires URL lists from the new-search result information database 605 and former-search result information database 607, compares URLs one by one between the two lists, identifies "new sites" which exist in the new-search result information database 605, but do not exist in the former-search result information database 607 and "vanished sites" which do not exist in the new-search result information database 605, but exist in the former-search result information database 607, and passes the URLs of both types of site to a site contents acquisition unit 611.

The site contents acquisition unit 611 accesses the web pages corresponding to the passed URLs, downloads page information, and stores it together with the URLs in a difference information database 606. Regarding the vanished sites, if sites themselves have vanished completely from the WWW, information to that effect is stored in the difference information database 606.

In FIG. 6, an HTML generator 612 acquires information about the new sites and vanished sites from the difference information database 606, converts all the information into an HTML file, and delivers the generated HTML file to a public web server. The user can view the stored difference information anytime using a web browser 604 or the like.

In FIG. 6, if there is a difference information output request from a user, an output request accepting unit 613 acquires information about new sites and vanished sites from the difference information database 606 and passes it to a difference information output unit 614. The difference information output unit 614 outputs the received information in an appropriate format.

Incidentally, functions of the automatic searcher 608, link target information extractor 609, difference information analyzer 610, site contents acquisition unit 611, HTML generator 612, output request accepting unit 613, difference information output unit 614, and search register 615 can be implemented through the execution of programs which implement these functions and are loaded onto a memory of a processor consisting of the memory, a CPU, and the like.

The memory consists of a RAM while the new-search result information database 605, difference information database 606, and former-search result information database 607 consist of a non-volatile recording device such as an EEPROM (Electrically Erasable Programmable Read-Only Memory), hard disk, magneto-optical disk, or the like.

<Operation of Information Processing Apparatus>

Next, operation of the information processing apparatus 601 according to the embodiment with the above configuration will be described with reference to flowcharts in FIGS. 7 to 10.

Figure 7:
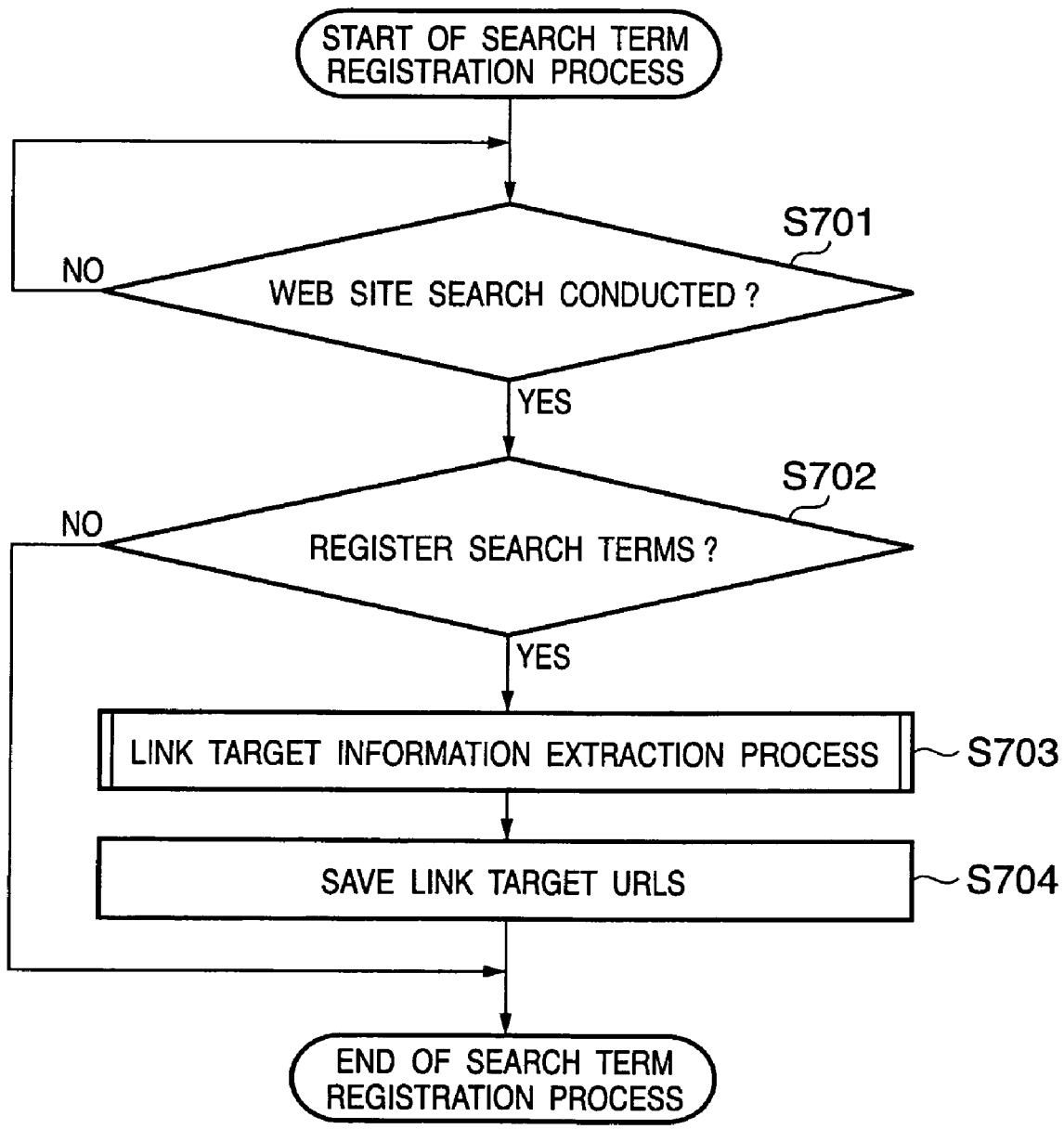
FIG. 7 is a flowchart illustrating search term registration procedures for the information processing apparatus according to the embodiment of the present invention.

FIG. 7 is a flowchart illustrating search term registration procedures for the information processing apparatus according to the embodiment of the present invention.

First, the information processing apparatus 601 determines whether a web site search was conducted by a user (Step S701). If a search was conducted (Yes), the information processing apparatus 601 asks the user whether the user wants to register the search terms used in the search, i.e., whether the user wants to acquire difference information in later searches (Step S702). If it is determined that the user wants to register the search terms (Yes), the information processing apparatus 601 performs a link target information extraction process (Step S703).

Figure 8:
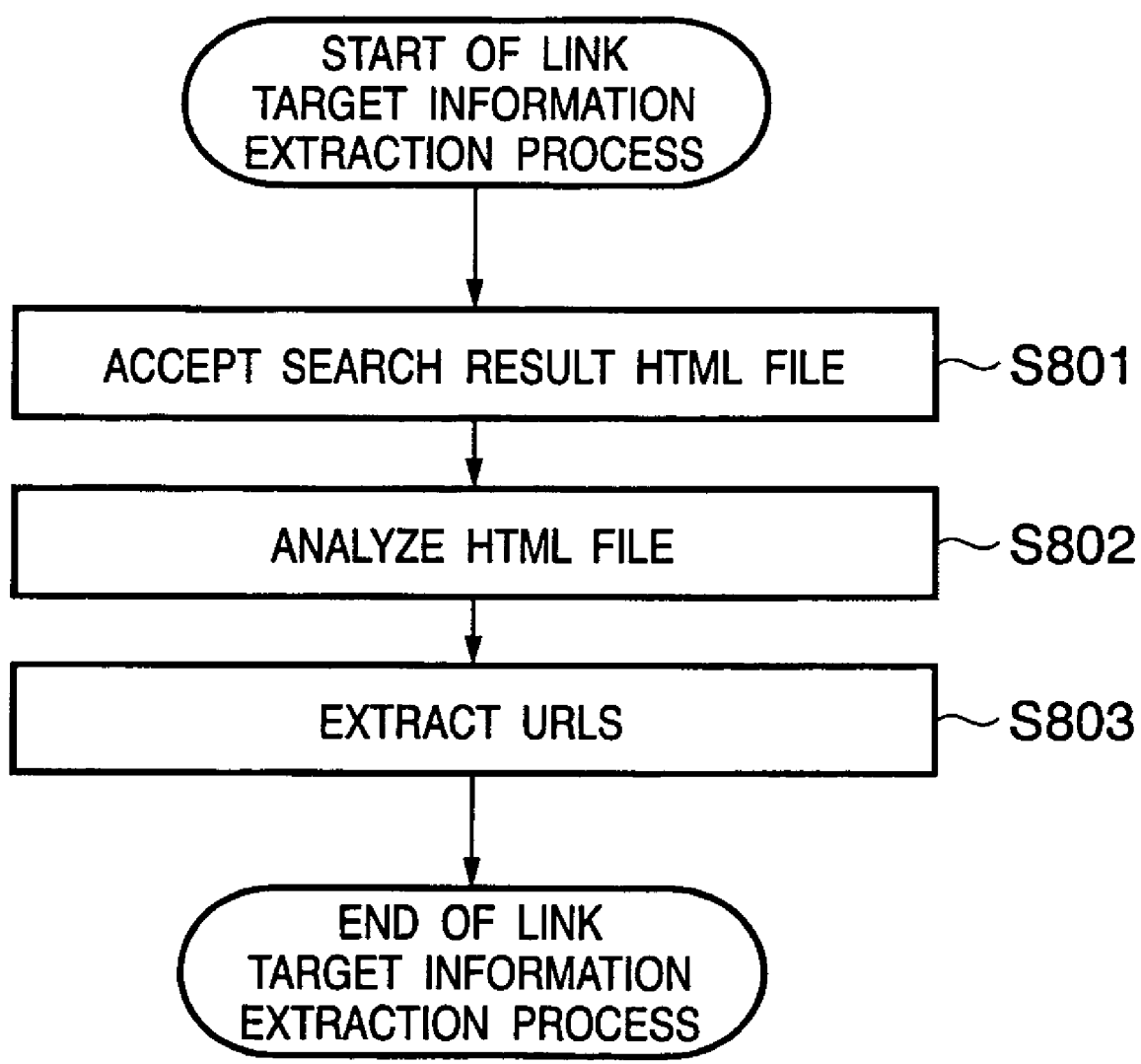
FIG. 8 is a flowchart illustrating details of a link target information extraction process (Step S703) in the search term registration process shown in FIG. 7.

FIG. 8 is a flowchart illustrating details of a link target information extraction process in the search term registration process shown in FIG. 7 (Step S703). The link target information extractor 609 accepts an HTML file outputted by a search engine (Step S801). Next, the link target information extractor 609 analyzes the accepted HTML file (Step S802) and extracts a link target URLs from HTML file (Step S803).

After the link target information (link target URLs) is extracted in Step S703, the search register 615 stores a URL list produced by a link target information extraction process in the former-search result information database 607 (Step S704) for later comparison.

Figure 9:
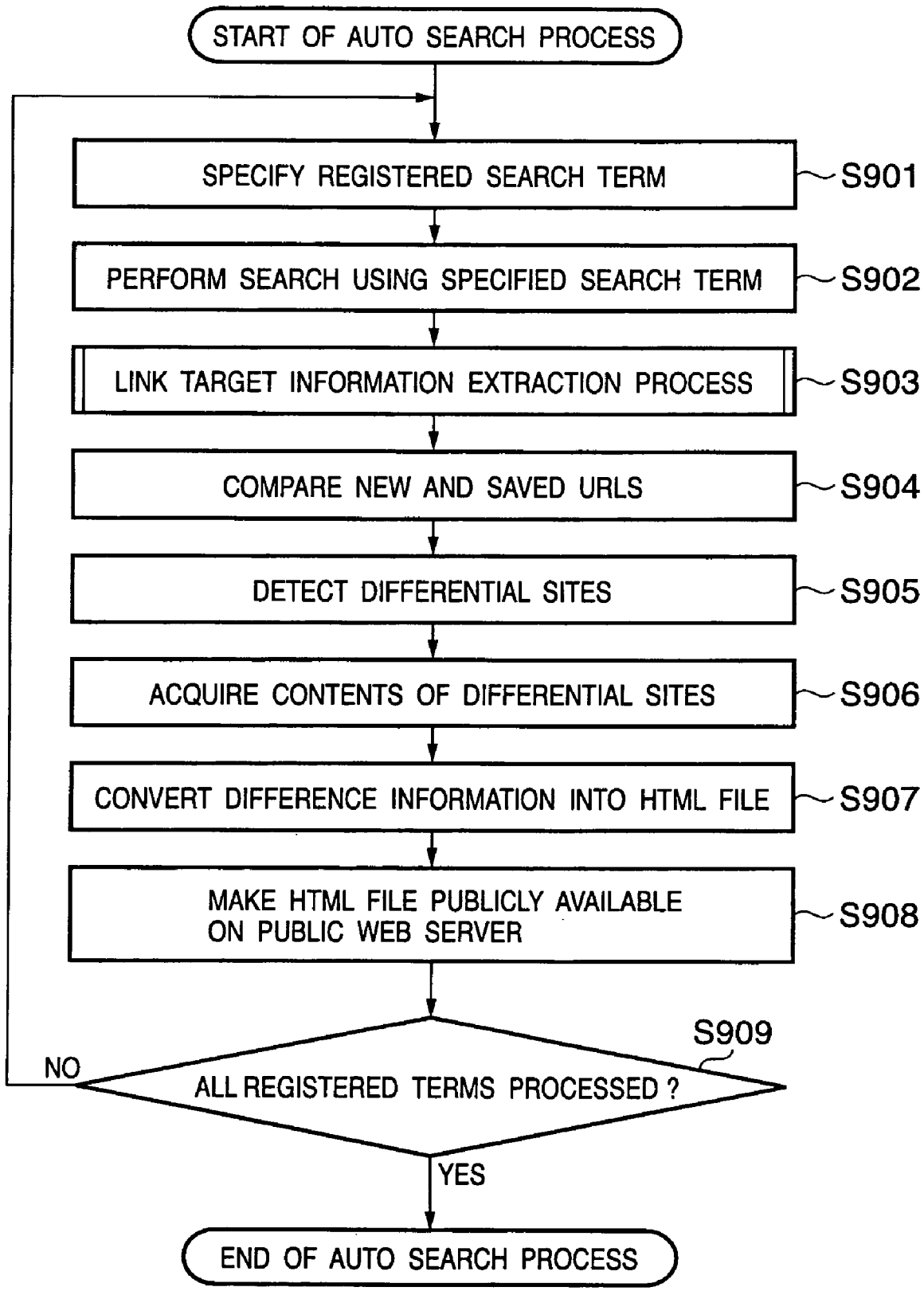
FIG. 9 is a flowchart illustrating auto search procedures for the information processing apparatus according to the embodiment of the present invention.

The information processing apparatus 601 automatically searches for web sites using the registered search terms and compares search results produced by searches performed at two different times using the same search terms. FIG. 9 is a flowchart illustrating auto search procedures for the information processing apparatus according to the embodiment of the present invention. Incidentally, the process described below is performed for each of the registered search terms.

The link target information extractor 609 specifies one of the search terms registered in the former-search result information database 607 (Step S901). Next, the automatic searcher 608 searches for web sites (Step S902) using the search term specified in Step S901. Next, the link target information extractor 609 performs the link target information extraction process described with reference to FIG. 8 to extract link target information from the produced search results (Step S903) and stores the extracted link target information in the new-search result information database 605.

Next, the difference information analyzer 610 extracts URLs from the new-search result information database 605 and former-search result information database 607 and makes, for example, m×n comparisons if there are m URLs and n URLs, respectively (Step S904). The difference information analyzer 610 detects newly added URLs (new sites) which exist in the new-search result information database 605, but do not exist in the former-search result information database 607 and now-defunct URLs (vanished sites) which do not exist in the new-search result information database 605, but exist in the former-search result information database 607 (Step S905), and passes the detected URLs to a site contents acquisition unit 611.

The site contents acquisition unit 611 accesses the web pages corresponding to the URLs passed from the difference information analyzer 610, downloads page information, and stores it together with the URLs in the difference information database 606 (Step S906). Regarding the sites found to have vanished, if sites themselves have vanished completely from the WWW, they are totally inaccessible, and thus information to that effect is stored in the difference information database 606.

Next, the HTML generator 612 acquires difference information from the difference information database 606 and converts the information into an HTML file (Step S907). The generated HTML file is made publicly available on a public web server 603 (Step S908).

Next, the information processing apparatus 601 determines whether the auto search process has been performed for all the registered search terms (Step S909). If it is found that the auto search process has not been performed for all the registered search terms (No), the information processing apparatus 601 returns to Step S901 and carries out Steps S901 to S908 for the next search term. On the other hand, if the auto search process has been performed for all the search terms (Yes), the information processing apparatus 601 finishes the process.

Basically, the information processing apparatus 601 executes the auto search processes at regular intervals. The intervals for the regularly-scheduled execution may be specified by the user.

Figure 10:
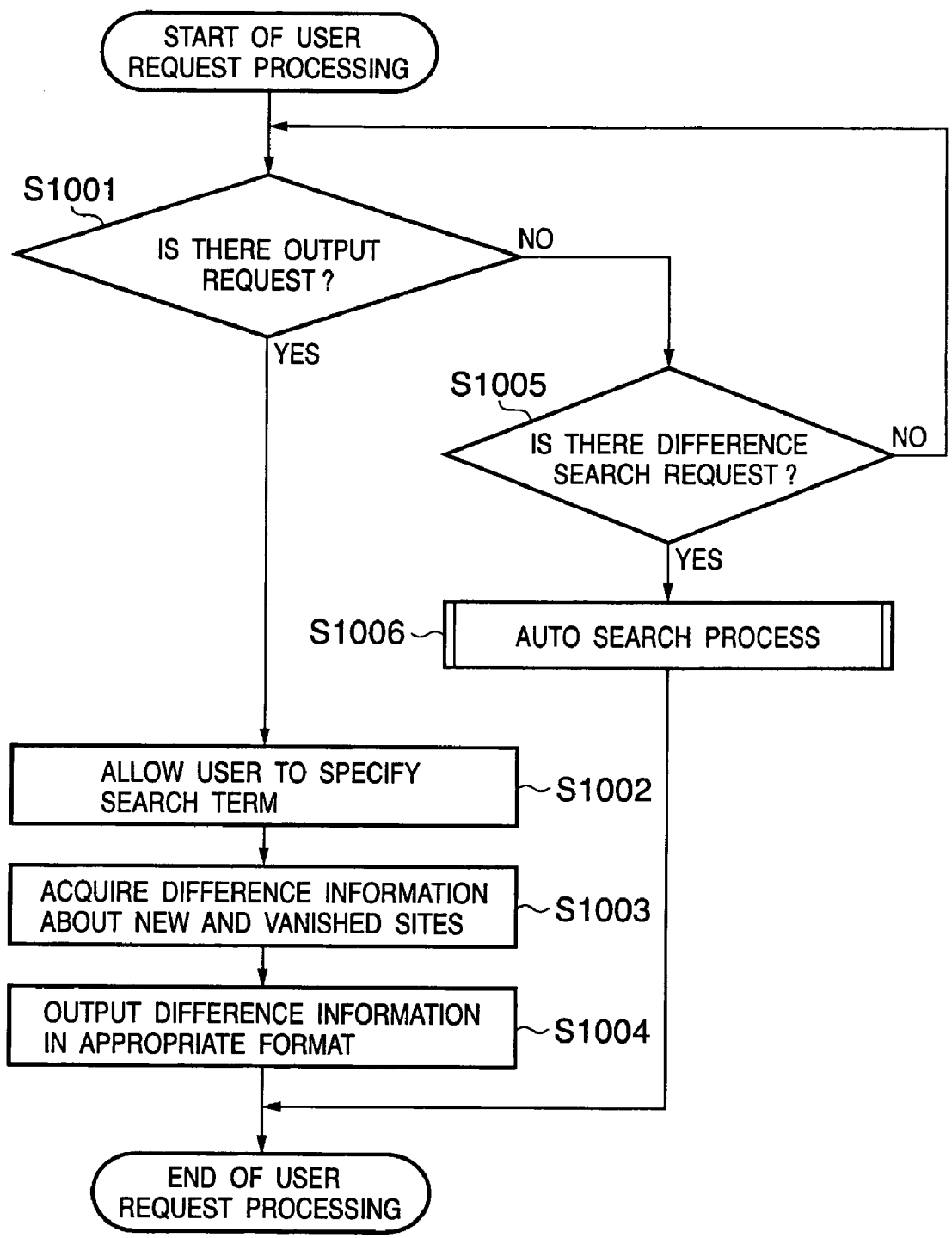
FIG. 10 is a flowchart illustrating user request processing procedures performed in a standby state of the information processing apparatus according to the embodiment of the present invention.

FIG. 10 is a flowchart illustrating user request processing procedures performed in a standby state of the information processing apparatus according to the embodiment of the present invention. In a standby state, the information processing apparatus 601 determines whether there is an output request for difference information from a user (Step S1001). If it is found that there is an output request (Yes), the output request accepting unit 613 allows the user to specify a search term in relation to which the user wants difference information (Step S1002). After that, the output request accepting unit 613 acquires difference information about new sites and vanished sites from the difference information database 606 (Step S1003). Subsequently, the difference information output unit 614 outputs the difference information acquired in Step S1003 in an appropriate format (Step S1004).

On the other hand, if it is found in Step S1001 that there is no output request (No), the information processing apparatus 601 determines whether there is a difference search request (Step S1005). If it is found that there is a difference search request (Yes), the information processing apparatus 601 performs the auto search process described with reference to FIG. 9 (Step S1006).

An overall operation of the information processing apparatus 601 has been described so far, but the operation flow described above is only an example and the present invention is not limited to the process flow described above. Also, although it has been stated that the information processing apparatus 601 is attached to the copier 1001, the above processes can similarly be implemented using a general-purpose personal computer or other information processing apparatus connected to the Internet.

<Example of Difference Information Display>

Figure 11:
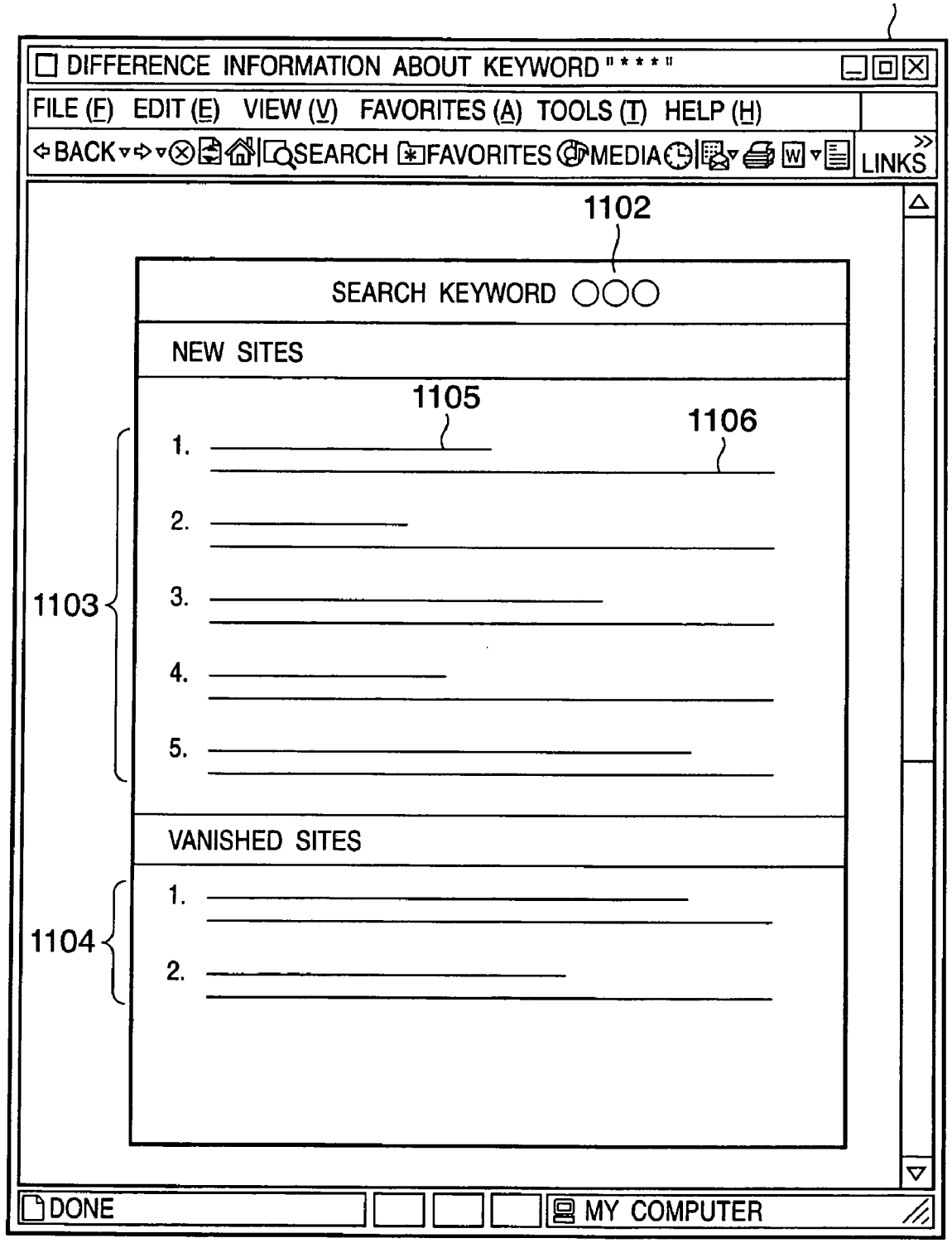
FIG. 11 is a diagram showing an example of an HTML file acquired by the information processing apparatus according to this embodiment, made publicly available on a public web server 603, and displayed on a web browser.

FIG. 11 is a diagram showing an example of an HTML file acquired by the information processing apparatus according to this embodiment, made publicly available on the public web server 603, and displayed on a web browser. In FIG. 11, reference numeral 1101 designates a web browser displayed on the operation screen of the information processing apparatus and 1102 designates a search term. Reference numeral 1103 designates a new-site list in which all new sites are listed by being numbered serially. Reference numeral 1104 designates a vanished-site list in which all vanished sites are listed by being numbered serially. Besides, reference numeral 1105 designates site name and 1106 designates a site URL.

Figure 12:
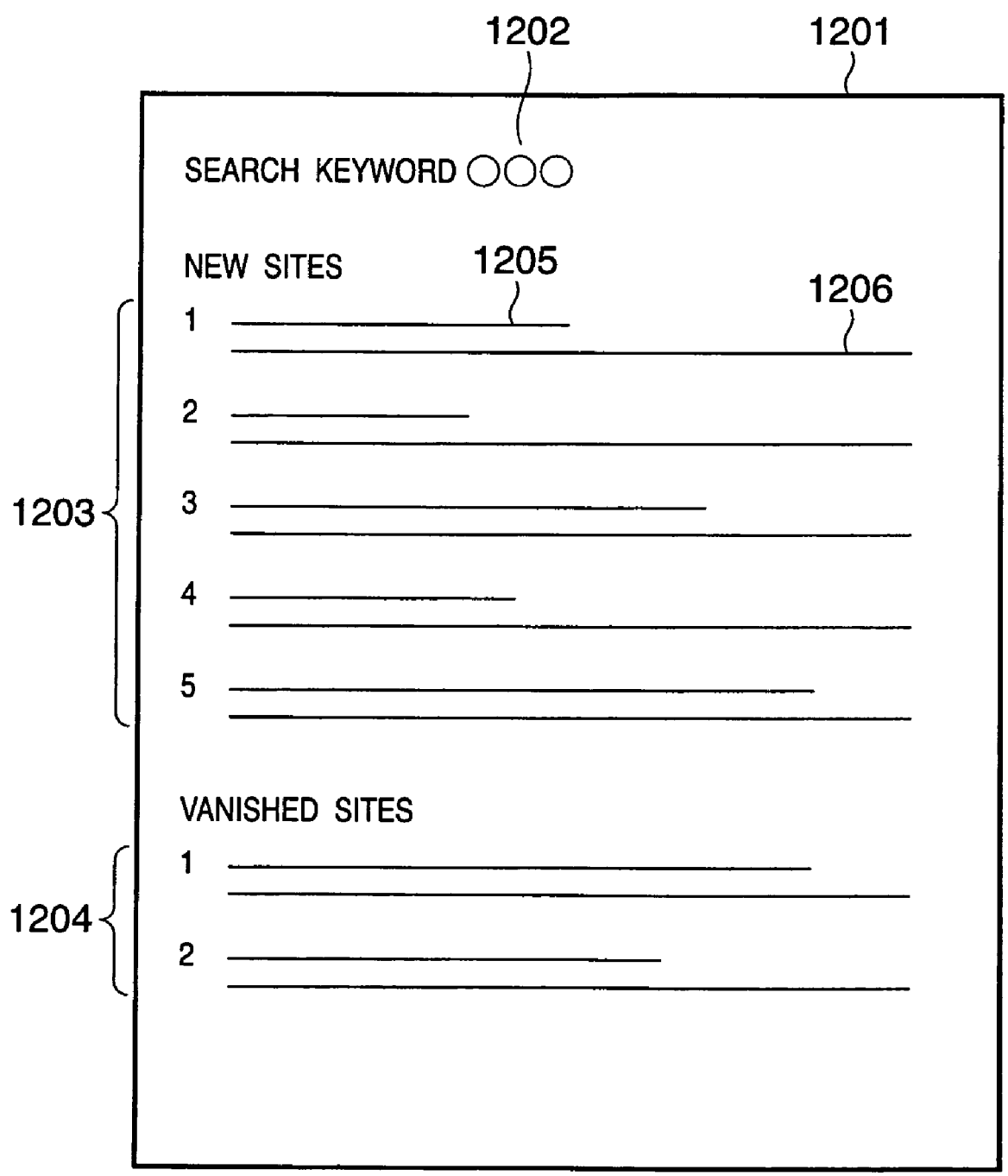
FIG. 12 is a diagram showing an example of difference information printed out at the request of a user using an HTML file acquired by the information processing apparatus according to this embodiment and made publicly available on a public web server 603.

FIG. 12 is a diagram showing an example of difference information printed out at the request of a user using an HTML file acquired by the information processing apparatus according to this embodiment and made publicly available on a public web server 603. In FIG. 12, reference numeral 1201 designates a printed sheet and 1202 designates a search term. Reference numeral 1203 designates a new-site list in which all new sites are listed by being numbered serially. Reference numeral 1204 designates a vanished-site list in which all vanished sites are listed by being numbered serially. Besides, reference numeral 1205 designates a site name and 1206 designates a site URL.

Although according to this embodiment, site names and URLs are listed as difference information, thumbnails may be displayed by extracting images of individual sites from the page information stored in the difference information database 606 and reducing the size of the images through conversion. Alternatively, character strings containing a search term (i.e., the given search term and, for example, one to two rows of character strings around it) may be extracted. If a site cannot be found by a search based on the same term as the previous search and page information about the vanished site is no longer available on the WWW, information indicating that the site no longer exists may be provided. If thumbnails or pages themselves of sites are stored at the time of searches, any site found to have vanished at the time of a subsequent search can be displayed or printed again using the stored thumbnails or pages.

As described above, by analyzing differences between search results produced by searches performed at different times, it is possible, for example, to know newly introduced sites, making it easy to obtain the latest information in a given category. By knowing vanished sites, it is possible to access sites which are no longer relevant to a search engine (i.e., sites whose contents have been changed). This makes it possible to know time-series flow of information in a given category.

In addition to listing search results as described above, by specifying printing of N new sites (N is an arbitrary number), it is possible to print N new sites in descending order of relevance to search criteria. Conversely, it is also possible to print vanished sites automatically by specifying printing of N vanished sites or all vanished sites in advance.

Regarding search methods, in addition to searches based on search terms, various search methods are applicable including a method of searching for sites containing images similar to those read by the reader 2070.

Also, the present invention is not limited to auto searches, but differences from past search results may be extracted and outputted after a manual search conducted by the user using the same search term.

Also, although searches for web sites on the Internet have been taken as an example, the present invention is also applicable to searches for various information on a network constructed independently (e.g., searches for various devices on the network).

Other Embodiment

Although an exemplary embodiment has been described above, the present invention can take the form of, for example, a system, apparatus, method, program, or storage medium (recording medium). Specifically, the present invention may be applied either to a system consisting of multiple apparatus or to equipment consisting of a single apparatus.

Incidentally, the present invention is also achieved when program code of software programs (programs which correspond to the illustrated flowcharts according to the embodiment) which implement the functions of the above embodiment is supplied directly or remotely to a system or apparatus and read out and executed by a computer of the system or apparatus.

Thus, the program code itself installed on the computer to implement functions and processes of the present invention on the computer also implements the present invention. That is, the present invention also includes the computer programs which implement the functions and processes of the present invention.

In that case, the program code may take any form including object code, programs executed by an interpreter, and script data supplied to an OS as long as it has program functions.

Recording media available for use to supply programs include, for example, floppy (registered trademark) disks, hard disks, optical disks, magneto-optical disks, MO, CD-ROM, CD-R, CD-RW, magnetic tape, non-volatile memory cards, ROM, DVD (DVD-ROM and DVD-R), etc.

The programs can also be supplied by allowing the user to connect to an Internet homepage using a browser on a client computer and download the computer programs themselves of the present invention or a compressed self-installing file from the homepage onto a recording medium such as a hard disk. Also, the program code of the programs according to the present invention may be divided into multiple files, which can be downloaded from respective homepages. That is, the present invention also includes WWW servers which allow multiple users to download program files capable of implementing the functions and processes of the present invention on a computer.

The present invention can also be implemented by supplying users with a storage medium such as a CD-ROM containing the programs of the present invention in encrypted form, providing key information for decryption to the user who satisfies predetermined conditions through a download from an Internet homepage, and allowing the user to decrypt and install the programs on a computer using the key information.

The functions of the above embodiment may be implemented not only by the programs read out and executed by the computer, but also by part or all of the actual processing executed, in accordance with instructions from the programs, by an OS running on the computer.

Furthermore, the functions of the above embodiment may also be implemented by part or all of the actual processing executed by a CPU or the like contained in a function expansion board inserted in the computer or a function expansion unit connected to the computer if the processing is performed in accordance with instructions from the programs that have been read out of the recording medium and written into memory on the function expansion board or unit.

The present invention makes it possible to inform the user easily and appropriately of differences in results of searches performed based on the same search criteria at different times.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-122948, filed on Apr. 20, 2005 which is hereby incorporated by reference herein in its entirety.

What is claimed is:

1. An information processing apparatus configured to communicate via a network, the information processing apparatus comprising:
   a search unit configured to perform an information search process to search for information on the network using input search criteria;
   a registration unit configured to register the search criteria used by the search unit in the search process; and
   a first search result retrieval unit configured to retrieve first search results produced by the search unit using the search criteria;
   wherein the search unit is further configured to perform an information re-search process using the search criteria registered by the registration unit to search the network for information again after the retrieval of the first search results, and the apparatus further comprising:

a second search result retrieval unit configured to retrieve second search results produced by the information re-search process, performed by the search unit, using the search criteria registered by the registration unit and used for producing the first search results, wherein the information re-search process performed by the search unit for the second search results is the same process as the information search process performed by the search unit for retrieving the first search results;

a generating unit configured to generate first difference information and second difference information from retrieved information by comparing the first search results and the second search results, wherein the first difference information includes information which is included in the second search result but not included in the first search results and wherein the second difference information includes information which is included in the first search results but not included in the second search results; and an output unit configured to output the first difference information and the second difference information generated by the generating unit, wherein the first difference information is output in distinction from the second difference information.

2. The information processing apparatus according to claim 1, wherein:

the search unit searches for web sites on the network;

the generating unit compares a link target URL group according to the first search results and a link target URL group according to the second search results and thereby generates a list of URLs corresponding to newly found web sites as the first difference information and generates a list of URLs corresponding to vanished web sites as the second difference information.

3. The information processing apparatus according to claim 2, wherein the generating unit generates the list of URLs corresponding to the newly found web sites and the list of URLs corresponding to the vanished web sites, as an HTML file.

4. The information processing apparatus according to claim 3, further comprising:

a display unit configured to display the HTML file generated by the generating unit on a display screen, wherein a portion of the display screen on which the list of URLs corresponding to the newly found web sites is displayed and a portion of the display screen on which the list of URLs corresponding to the vanished web sites is displayed are different.

5. The information processing apparatus according to claim 1, wherein the output unit forms images on a recording medium based on the first difference information and the second difference information generated by the operation unit.

6. The information processing apparatus according to claim 1, wherein:

the search unit performs searches at predetermined time intervals using the search criteria;

the second search result retrieval unit retrieves second search results by making the search unit perform follow-up searches at the predetermined time intervals; and the generating unit generates the first difference information and the second difference information from retrieved information every predetermined time interval.

7. The information processing apparatus according to claim 6, further comprising:

an instruction input unit configured to accept, from a user, instructions concerning the predetermined time intervals at which searches are performed by the search unit using the search criteria.

8. The information processing apparatus according to claim 1, wherein the information re-search process is a follow-up search performed by the search unit based on instructions from a user using the search criteria registered by the registration unit.

9. An information processing method for an information processing apparatus configured to communicate via a network, the method comprising:

a search step of using the information processing apparatus to perform an information search process to search for information on the network using input search criteria;

a registration step of registering the search criteria used by the search step in the search process;

a first search result retrieval step of retrieving first search results produced by the information search process using the search criteria;

a re-search step of performing an information re-search process using the search criteria registered by the registration step to search the network for information again after the retrieval of the first search results;

a second search result retrieval step of retrieving second search results produced by the information re-search process using the registered search criteria used for producing the first search results, wherein the information re-search process performed by the search unit for the second search results is the same process as the information search process performed by the search unit for the first search results;

a generating step of generating first difference information and second difference information from retrieved information by comparing the first search results and the second search results, wherein the first difference information includes information which is included in the second search results but not included in the first search results and wherein the second difference information includes information which is included in the first search results but not included in the second search results; and an output step of outputting the first difference information and the second difference information generated in the generating step, wherein the first difference information is output in distinction from the second difference information.

10. A computer-executable program, stored on a computer-readable storage medium, for an information processing apparatus configured to communicate via a network, wherein the program makes the computer execute:

a search step of performing an information search process to search for information on the network using input search criteria;

a registration step of registering the search criteria used by the search step in the search process;

a first search result retrieval step of retrieving first search results produced by the information search process using the search criteria;

a re-search step of performing an information re-search process using the search criteria registered by the registration step to search the network for information again after the retrieval of the first search results;

a second search result retrieval step of retrieving second search results produced by the information re-search process using the registered search criteria used for producing the first search results, wherein the information re-search process performed by the search unit for the second search results is the same process as the information search process performed by the search unit for the first search results;

a generating step of generating first difference information and second difference information from retrieved information by comparing the first search results and the second search results, wherein the first difference information includes information which is included in the second search results but not included in the first search results and wherein the second difference information includes information which is included in the first search results but not included in the second search results; and an output step of outputting the first difference information and the second difference information generated in the generating step, wherein the first difference information is output in distinction from the second difference information.

\* \* \* \* \*